United States Patent
Nakamura et al.

(10) Patent No.: US 11,122,310 B2
(45) Date of Patent: Sep. 14, 2021

(54) VIDEO SWITCHING SYSTEM

(71) Applicant: Media Links Co., Ltd., Kawasaki (JP)

(72) Inventors: Kazunori Nakamura, Kawasaki (JP); Kazuki Narita, Kawasaki (JP)

(73) Assignee: Media Links Co., Ltd., Kawasaki (JP)

( * ) Notice: Subject to any disclaimer, the term of this patent is extended or adjusted under 35 U.S.C. 154(b) by 0 days.

(21) Appl. No.: 16/645,890

(22) PCT Filed: Sep. 14, 2017

(86) PCT No.: PCT/JP2017/033304
§ 371 (c)(1),
(2) Date: Mar. 10, 2020

(87) PCT Pub. No.: WO2019/053853
PCT Pub. Date: Mar. 21, 2019

(65) Prior Publication Data
US 2020/0280749 A1 Sep. 3, 2020

(51) Int. Cl.
*H04N 21/242* (2011.01)
*H04L 1/22* (2006.01)
(Continued)

(52) U.S. Cl.
CPC ............. *H04N 21/242* (2013.01); *H04L 1/22* (2013.01); *H04L 43/106* (2013.01);
(Continued)

(58) Field of Classification Search
CPC .. H04N 21/242; H04N 5/268; H04N 21/4305; H04N 21/6437; H04L 1/22;
(Continued)

(56) References Cited

U.S. PATENT DOCUMENTS 8,756,483 B2\* 6/2014 Kim ...................... H04L 1/0053
714/776
2008/0031448 A1\* 2/2008 Dang ............... H04N 21/23476
380/200
(Continued)

FOREIGN PATENT DOCUMENTS

JP 2003174632 A 6/2003
JP 2009528709 A 8/2009
(Continued)

*Primary Examiner* — Richard A Hansell, Jr.
(74) *Attorney, Agent, or Firm* — The Webb Law Firm

(57) ABSTRACT

The video switching system includes a PTP grand master, a first and second transmitters configured to synchronize a time with the PTP grand master according to PTP, and a receiver connected to the first transmitter and the second transmitter over an IP-network. The first and second transmitter respectively receive video signals distributed from one video signal, divide the video signals into a plurality of IP-packets and set timestamps to the plurality of IP-packets, the timestamps based on the synchronized time according to PTP. The first transmitter sends the plurality of IP-packets set the timestamps as a first IP-packet stream via a first transmission path according to RTP. The second transmitter sends the plurality of IP-packets set the timestamps as a second IP-packet stream via a second transmission path according to RTP.

7 Claims, 12 Drawing Sheets

(51) Int. Cl.
*H04L 12/26* (2006.01)
*H04L 29/06* (2006.01)
*H04N 5/268* (2006.01)
*H04N 21/43* (2011.01)
*H04N 21/6437* (2011.01)

(52) U.S. Cl.
CPC .......... *H04L 65/608* (2013.01); *H04N 5/268* (2013.01); *H04N 21/4305* (2013.01); *H04N 21/6437* (2013.01)

(58) Field of Classification Search
CPC . H04L 43/106; H04L 65/608; H04L 65/4076; H04L 65/80; H04L 29/14
See application file for complete search history.

(56) References Cited

U.S. PATENT DOCUMENTS

| | | | |
|---|---|---|---|
| 2009/0106807 A1* | 4/2009 | Suzuki | H04N 21/44016 725/114 |
| 2009/0220011 A1 | 9/2009 | Kursawe et al. | |
| 2010/0067370 A1* | 3/2010 | Nagana | H03M 13/35 370/216 |
| 2012/0263263 A1* | 10/2012 | Olsen | H04L 67/16 375/354 |
| 2013/0003757 A1* | 1/2013 | Boatright | H04N 21/242 370/474 |
| 2013/0335629 A1* | 12/2013 | Laurent | H04N 21/4385 348/515 |
| 2017/0070772 A1* | 3/2017 | Nakamura | H04N 21/4425 |
| 2017/0264665 A1* | 9/2017 | Stevens | H04L 65/80 |
| 2017/0272693 A1* | 9/2017 | Strein | H04J 3/0667 |
| 2018/0070126 A1* | 3/2018 | Martel | H04L 65/608 |
| 2019/0306670 A1* | 10/2019 | Lipfert | H04W 72/005 |
| 2019/0394518 A1* | 12/2019 | Martel | H04N 21/440227 |

FOREIGN PATENT DOCUMENTS

| | | |
|---|---|---|
| JP | 2010109978 A | 5/2010 |
| JP | 201755273 A | 3/2017 |
| WO | 2014181381 A1 | 11/2014 |

* cited by examiner

VIDEO SWITCHING SYSTEM

CROSS-REFERENCE TO RELATED APPLICATION

This application is the United States national phase of International Application No. PCT/JP2017/033304 filed Sep. 14, 2017, the disclosure of which is hereby incorporated by reference in its entirety.

TECHNICAL FIELD

This disclosure relates to a video switching system, and more specifically, to a video switching system for switching IP-packetized video signals seamlessly.

DESCRIPTION OF RELATED ART

It is well-known that there is a broadcast system for transmitting video signals for sport broadcast from a stadium to a broadcast relay center directly to a broadcast station. Alternatively, it is well-known that there is a video transmitting system for transmitting video signals by multicast from a (main) broadcast station to other broadcast station. In the case of transmitting these video signals, the video signals are often converted to IP-packets and transmitted over an IP-network according to RTP (Real-time Transport Protocol). RTP refers to a protocol for delivering data signals such as audio and motion video in real time.

If a transmission path fails used for transmitting the above video signals, the IP-packets may not be transmitted. In order to address this situation, it is well-known to make the transmission path redundant. Making the transmission path redundant allows for, in the case of failure of an active transmission path, transmitting the IP-packets by switching the IP-packets from the active transmission path to a backup transmission path, thereby avoiding the interruption of transmitting the IP-packets. When the video signals are switched without any control, the corruption of videos are visible to a viewer. Therefore, in switching the IP-packets, it is necessary to switch the IP-packets seamlessly.

SMPTE (Society of Motion Picture and Television Engineers) 2022-7 Standard specifies the transmission scheme for switching the IP-packets and transmitting the video signals. SMPTE2022-7 specifies that a transmission side (transmitter) transmits a plurality of IP-packets including the same payload data to a destination via a plurality of different transmission paths (Ethernet). FIG. 1 shows the packet transmission scheme according to SMPTE2022-7.

As shown in FIG. 1, a transmitter 1 and a receiver 2 are connected via a transmission path 4 (active) and a transmission path 5 (backup) over an IP-network 3. The transmitter 1 receives input video signals (SDI signals, DVB-ASI signals or video and audio information contained in a payload in IP-packets received over Ethernet) transmitted from a broadcast station, encapsulate the input video signals into series of IP-packets (hereinafter referred to as "IP-packet stream"), duplicates the IP-packet (two IP-packet streams including the same payload data are generated by the duplication), and transmits the two IP-packet streams via the transmission paths 4 and 5, respectively. The same RTP sequence numbers are set to the duplicated two IP-packet streams. Since the IP-packets are transmitted via the transmission paths 4 and 5, respectively, different IP-headers, different MAC-headers, or different VLAN-tags, or all of them are set to the IP-packets, respectively. The receiver 2 receives the two IP-packet streams transmitted via the transmission paths 4 and 5, respectively, and normally reconstructs the video signals based on the IP-packet stream transmitted via the transmission path 4.

If the transmission path 4 fails, it is necessary to switch the IP-packets from the transmission path 4 to the transmission path 5. The receiver 2 controls such that the delays in receiving the IP-packet stream via the transmission paths 4 and 5 match at a switching point by buffering the IP-packet streams in buffer memories 2a and 2b for controlling the delay times (delay buffer). Thereby, it is possible to switch the IP-packet stream without corrupting the videos.

FIG. 1 shows that the transmission path 4 fails when the receiver 2 receives the IP-packet including the RTP sequence number "2". In this case, the receiver 2 cannot receive the IP-packets including the RTP sequence number "3" or "4" via the transmission path 4. On the other hand, the receiver 2 receives the IP-packets including the RTP sequence numbers "3" and "4" subsequent to receiving the IP-packet including the RTP sequence number "2" via the transmission path 5. When the receiver 2 reconstructs one IP-packet stream from the two IP-packet streams received via the transmission paths 4 and 5, the receiver 2 detects that the IP-packet including the RTP sequence number "3" is not in the delay buffer in the transmission path 4, and switches to the transmission path 5. Thereby, it can avoid the packet loss and the corruption of the reconstructed video signals by reconstructing the IP-packet stream from the IP-packets including the RTP sequence numbers "3" and "4" in the delay buffer in the transmission path 5. It can achieve the seamless video signal switching.

CITATION LIST

Patent Literature

PTL 1: Japanese Patent Application Laid-Open No. 2009-528709

SUMMARY

In the above-mentioned scheme, if the transmitter fails, it may not be possible to transmit the IP-packet streams via any of the two transmission paths. Accordingly, when it requires higher reliability, it is necessary to make the transmitter redundant (e.g. using a plurality of devices and/or cards). In the scheme specified in SMPTE2022-7, since the video signals are reconstructed using the RTP sequence numbers, it is necessary to match the RTP sequence numbers among the plurality of redundant transmitters. However, there is no technique for matching the RTP sequence numbers among the plurality of transmitters. It is not possible to make the transmitter redundant in the scheme of reconstructing the video signals based on the RTP sequence numbers.

PTL 1 discloses a video encoder and decoder for indicating a position for a main service image sequence of a particular individual image received in a zapping service by having the same timestamps in a plurality of RTP packets including data originated from the same images of input image sequence. In PTL 1, the same timestamps are included in the plurality of RTP packets with the same vides. It is not different from having the same RTP sequence numbers in the plurality of RTP packets, and cannot address the above-mentioned problem.

The embodiment provides a video switching system for transmitting video signals over an IP-network according to PTP and switching the transmitted IP-packets in a receiver without matching the RTP sequence numbers among the plurality of transmitters.

The video switching system according to one embodiment includes a PTP grand master, a first transmitter configured to synchronize a time with the PTP grand master according to PTP, a second transmitter configured to synchronize a time with the PTP grand master according to PTP, and a receiver connected to the first transmitter and the second transmitter over an IP-network, wherein the first transmitter and the second transmitter respectively, receive video signals distributed from one video signal, divide the video signals into a plurality of IP-packets, and set timestamps to the plurality of IP-packets, the timestamps based on the synchronized time according to PTP, the first transmitter sends the plurality of IP-packets set the timestamps as a first IP-packet stream via a first transmission path according to RTP, and the second transmitter sends the plurality of IP-packets set the timestamps as a second IP-packet stream via a second transmission path according to the RTP.

The video switching system according to another embodiment includes a first transmitter configured to receive video signals distributed from one video signal, divide the video signals into a plurality of IP-packets and send the plurality of IP-packets as a first IP-packet stream via a first transmission path according to RTP, a second transmitter configured to receive the distributed video signals, divide the video signals into a plurality of IP-packets and send the plurality of IP-packets as a second IP-packet stream via a second transmission path according to the RTP, and a receiver connected to the first transmitter and the second transmitter over an IP-network, the receiver configured to determine a first IP-packet indicating a video frame boundary in the first IP-packet stream, determine a second IP-packet indicating a video frame boundary in the second IP-packet stream, conduct a first comparison of a sequence number in any IP-packet in the first IP-packet stream with a sequence number in the first IP-packet, conduct a second comparison of a sequence number in any IP-packet in the second IP-packet stream with a sequence number in the second IP-packet, identify a pair of IP-packets including same payloads in the first IP-packet stream and the second IP-packet stream in response to that the first comparison and the second comparison match, if receiving the pair of IP-packets, select one of the pair of IP-packets to reconstruct video signals, and if receiving one IP-packet of the pair of IP-packets only, use the one IP-packet to reconstruct the video signals.

According to the video switching system of the embodiment, the plurality of redundant transmitters can switch the IP-packets seamlessly without matching the RTP sequence numbers when the active transmitter fails.

DETAILED DESCRIPTION

First Embodiment

Figure 1:
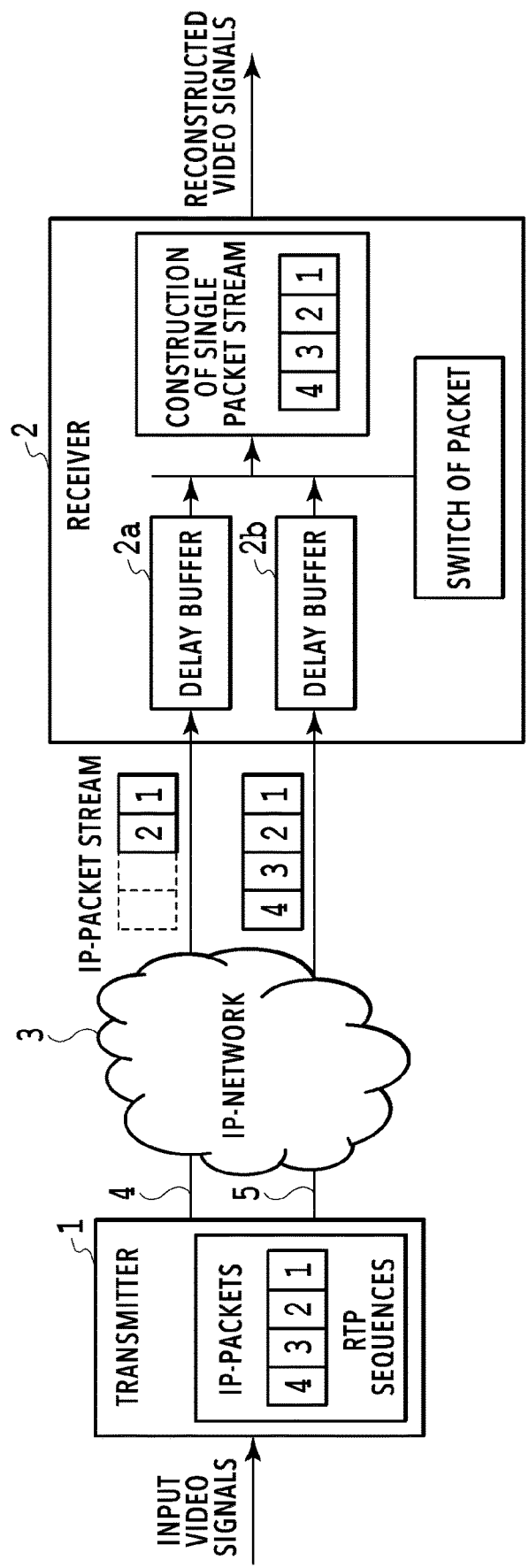
FIG. 1 shows a scheme for transmitting video signals according to SMPTE2022-7.
Figure 2:
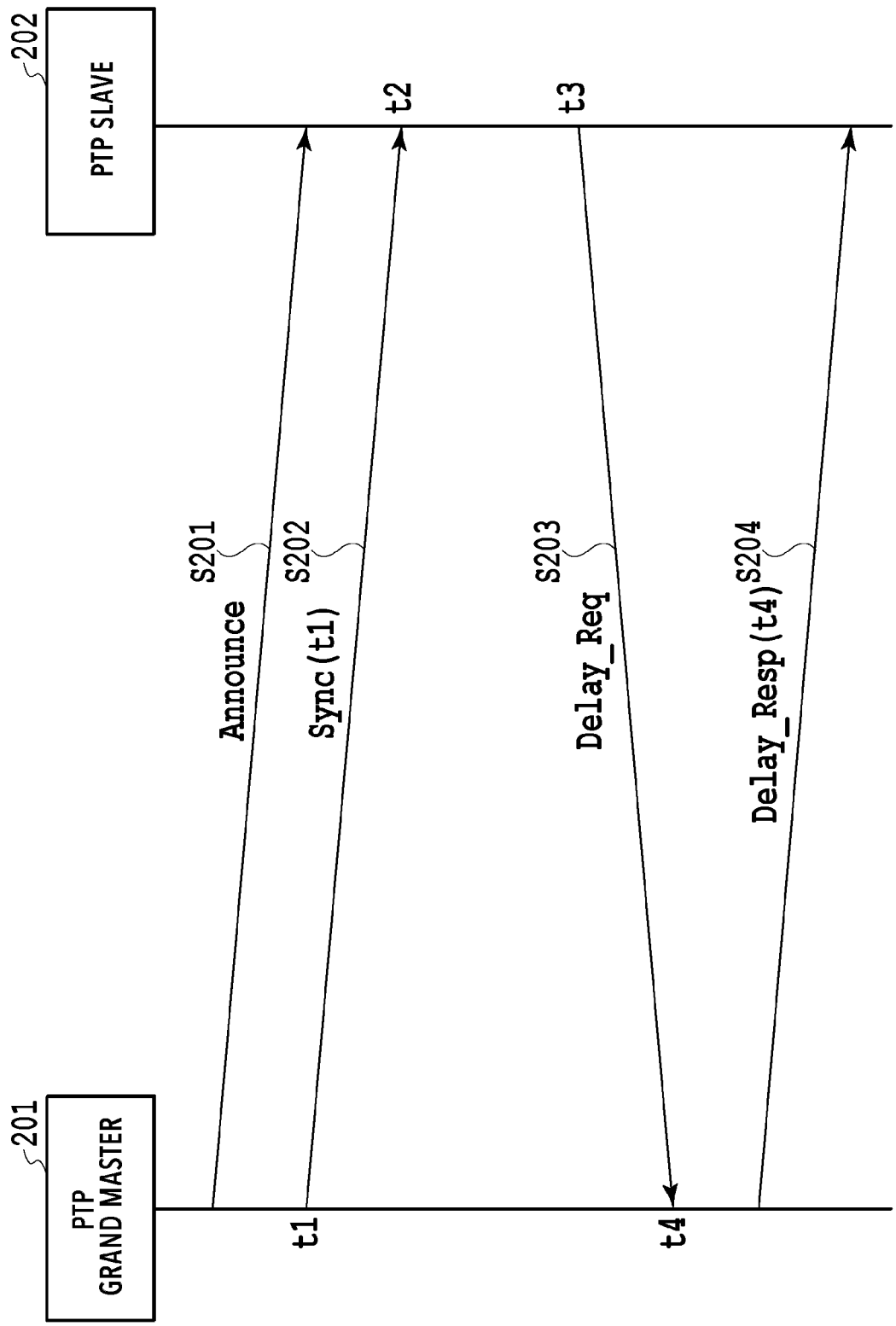
FIG. 2 shows operations based on PTP performed in a video switching system according to a first embodiment.

Referring to the drawings, the embodiments will be described. FIG. 2 shows operations based on PTP (Precision Time Protocol) performed in a video switching system according to a first embodiment. PTP refers to a time synchronization protocol specified in IEEE (Institute of Electrical and Electronics Engineers) 1588v2 that allows for the accuracy within a nanosecond level error.

IEEE 1588v2 specifies a time delivering method with high accuracy over a LAN (Local Area Network). A network according to PTP includes a PTP grand master and a PTP slave. The PTP grand master is generally implemented as hardware for using for example GPS signals with high accuracy, atomic clock signals, or BB (Black Burst) signals for synchronizing video signals as a reference clock source. The PTP slave synchronizes a time with the PTP grand master.

As shown in FIG. 2, the PTP grand master 201 sends a Announce message to the PTP slave 202, and a relation between the PTP grand master 201 and the PTP slave 202 is established (step S201).

Next, the PTP grand master 201 sends a Sync message to the PTP slave 202 (step S202). The Sync message includes a time t1 at which it was sent. Once the PTP slave 202 receives the Sync message, a time t2 at which it was received is recorded.

The PTP slave 202 sends a Delay_Req message to the PTP slave 202 (step S203). The Delay_Req message includes a time t3 at which it was actually sent.

Next, the PTP grand master 201 sends a Delay_Resp message to the PTP slave 202 (step S204). The Delay_Resp message includes a time t4 at which it was actually received.

The PTP slave 202 calculates a round trip delay times and an offset (time difference) between the times in the PTP grand master 201 and the PTP slave 202. Provided that the one way delay time corresponds to one half of the round trip delay times, the offset for the PTP slave 202 would be calculated according to the following equation (1).

$$\text{Offset}=(t2-t1)-(\text{one way delay time})$$

$$(\text{One way delay time})=\{(T2-T1)+(T4-T3)\}/2 \qquad (1)$$

The PTP slave 202 maintains the time synchronization with the PTP grand master 201 by repeating the operations of PTP multiple times per second, smoothing the calculated offset values, and reflecting the offset values in the time information.

The embodiment describes the operations of PTP in the one step clock and the E2E (End-to-End) delay mechanism. Actually, PTP also specifies the two step clock and the P2P (Peer-to-Peer) delay mechanism. Further time correction operations are performed, and the time synchronization with higher accuracy is achieved. However, the disclosure does not provide further detailed description.

Figure 3:
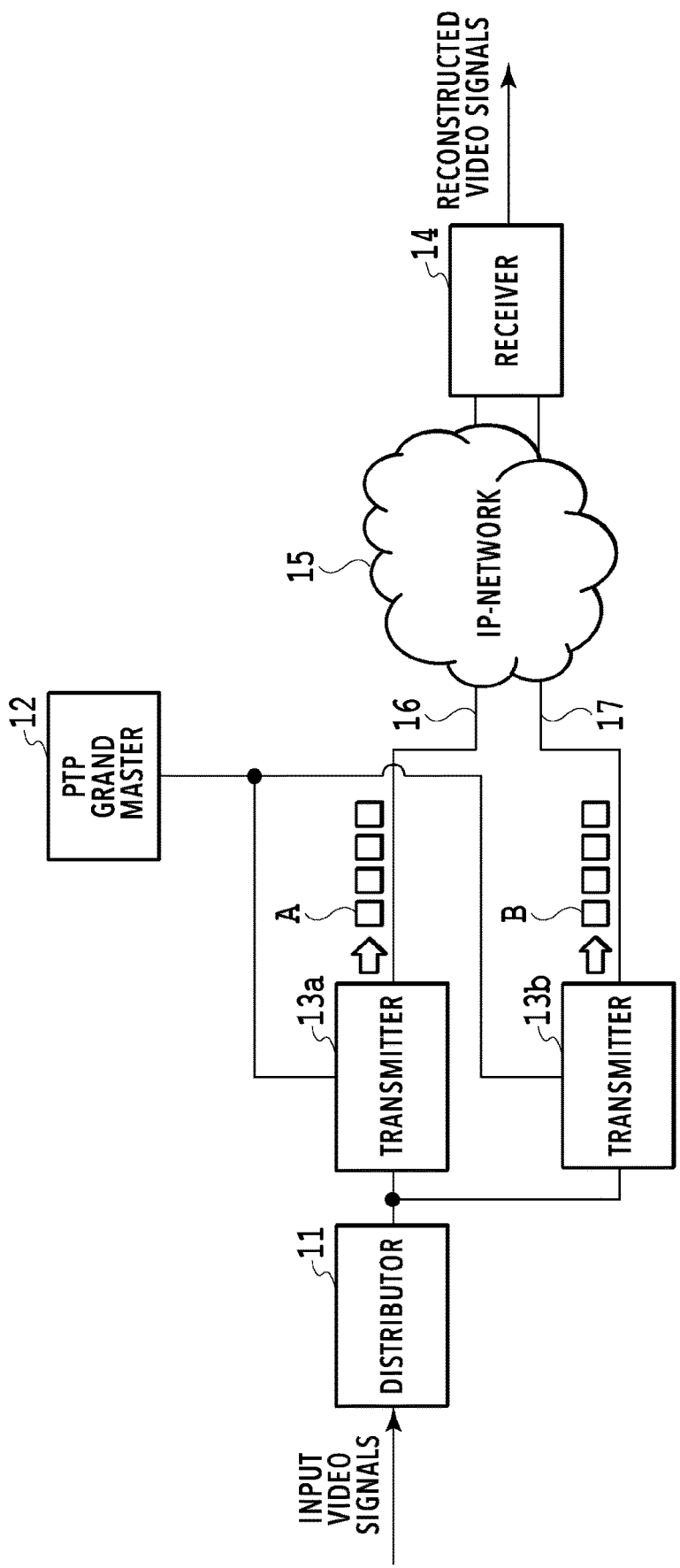
FIG. 3 shows a configuration of a video switching system according to a first embodiment.

Then, referring to FIG. 3, a configuration of a video switching system according to a first embodiment is described. It is assumed that the video switching system according to the embodiments operates according to the protocol such as SMPTIE2022-2 (specifying the transmission of MPEG-2 transport streams (TS) over IP-network) and SMPTE2022-6 (specifying the transmission of media signals with high bit rate over IP-network). Also, it is assumed that the IP-packets are transmitted over the IP-network according to RTP (Real-time Transport Protocol)/UDP (User Datagram Protocol).

As shown in FIG. 3, the video switching system according to the first embodiment comprises a distributor 11, a PTP grand master 12, a transmitter 13a, a transmitter 13b, and a receiver 14. The transmitter 13a, the transmitter 13b, and the receiver 14 are connected over an IP-network 15. A transmission path 16 is between the transmitter 13a and the receiver 14, and a transmission path 17 is between the transmitter 13b and the receiver 14.

The distributor 11 receives input video signals transmitted from a broadcast station for example, and distributes the input video signals to the transmitters 13a and 13b. That is, the distributor 11 duplicates the input video signals. In the case that the video signals correspond to SDI signals or DVB-ASI signals, the distributor 11 corresponds a distributor including a connector with a coaxial cable or optical fiber cable. In the case that the video signals are transmitted via Ethernet, the distributor 11 corresponds to an Ethernet switch.

The PTP grand master 12 functions as the PTP grand master described in reference to FIG. 2. The PTP grand master 12 synchronizes the time with the transmitters 13a and 13b. Optionally, the grand master 12 may also synchronizes the time with the receiver 14.

The transmitters 13a and 13b generate IP-packet streams from the input video signals distributed by the distributor 11, and send the IP-packet streams to the receiver 14 over the IP-network 15, respectively. The transmitter 13a sends an IP-packet stream A to the receiver 14 via the transmission path 16 according to RTP. The transmitter 13b sends an IP-packet stream B to the receiver 14 via the transmission path 17 according to RTP. That is, each of the transmitters 13a and 13b sends the IP-packet stream including the same payloads via a separate transmission path.

In the case that the receiver 14 reconstructs the video signals based on the IP-packet stream A, if the transmitter 13a or the transmission path 16 (active system) fails, the receiver 14 switches to the IP-packet stream B sent via the transmission path 17 for reconstructing the video signals. The RTP sequence numbers included in the IP-packets in the IP-packet streams sent from the transmitters 13a and 13b are independent, and are not set the same numbers.

Each of the transmitters 13a and 13b functions as a PTP slave, and synchronizes the time with the PTP grand master 12 according to PTP. The RTP timestamp in the IP-packet (timestamp field in the RTP header) sent from the transmitter 13a is set a timestamp based on the time information synchronized according to PTP. Similarly, the RTP timestamp in the IP-packet sent from the transmitter 13b is set a timestamp based on the time information synchronized according to PTP. The detailed description of a method for converting the PTP timestamp to the RTP timestamp will be provided in the following section. Since the IP-packets including the same payloads in the IP-packet streams A and B are IP-packetized from the same video signals at the same time, the difference between the both of the timestamps is slight within the time difference between the PTP slaves.

Although the embodiment employs the redundant system including two transmitters: the transmitter 13a and the transmitter 13b, the number of transmitters is not limited to two, and any number of transmitters are possible. Any number of transmission paths are possible according to the number of transmitters.

The PTP grand master 12 may also be implemented in the transmitter 13a, the transmitter 13b, or a third transmitter (not shown) other than the transmitters 13a and 13b. For example, if the PTP grand master 12 is implemented in the transmitter 13a, the transmitter 13b synchronizes the time with the transmitter 13a. If the PTP grand master 12 is implemented in the third transmitter, the transmitters 13a and 13b synchronize the times with the third transmitter, respectively.

The receiver 14 receives the IP-packet stream A sent via the transmission path 16 and the IP-packet stream B sent via the transmission path 17. In the normal state, the receiver 14 reconstructs the video signals based on the IP-packet stream A only (the IP-packet stream B is discarded). On the other hand, if the active system fails for example, the receiver 14 switches from the IP-packet stream A to the IP-packet stream B to reconstruct the video signals based on the IP-packet stream B. In order to switch without corruption of the video signals to be outputted, the receiver 14 controls such that the delays in receiving both of the IP-packet streams match at the switching point by buffering the IP-packet streams A and B in the delay buffers. The receiver 14 determines whether the IP-packets in the IP-packet stream A includes the same payloads as those of the IP-packets in the IP-packet stream B based on whether the difference between the RTP timestamps (RTP timestamps is set the timestamp converted from the timestamp time-synchronized according to PTP) is within a predetermined range.

Figure 4:
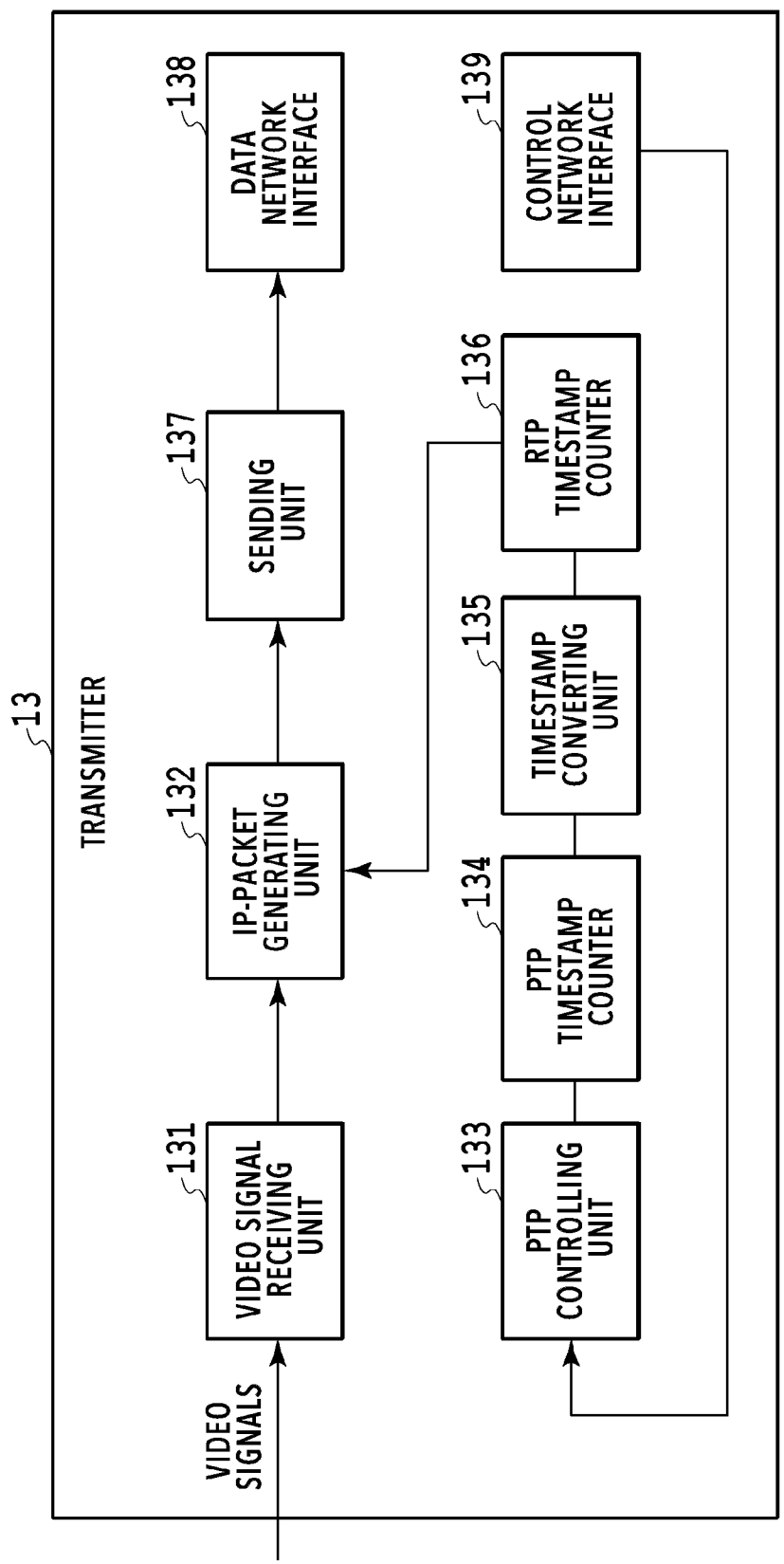
FIG. 4 shows a configuration of a transmitter according to a first embodiment.

Then, referring to FIG. 4, a configuration of the transmitters 13a and 13b (collectively referred to as "transmitter 13" in FIG. 4) described in reference to FIG. 3 is described. As shown in FIG. 4, the transmitter 13 comprises a video signal receiving unit 131, an IP-packet generating unit 132, a PTP controlling unit 133, a PTP timestamp counter 134, a timestamp converting unit 135, a RTP timestamp counter 136, a sending unit 137, a data network interface 138, and a control network interface 139.

The video signal receiving unit 131 receives the video signals distributed by the distributor 11. The IP-packet generating unit 132 generates the IP-packets from the received video signals according to RTP/UDP/IP for transmission over the IP-network 15. More specifically, the IP-packet generating unit 132 generates the IP-packets by adding the RTP headers, the UDP headers, the IP headers, and/or the MAC headers.

The PTP controlling unit 133 receives PTP messages from the PTP grand master 12 via the control network interface 139, and synchronizes the time with the PTP grand master 12. The PTP timestamp counter 134 is incremented based on the time synchronization.

The timestamp converting unit 135 converts the incremented timestamp of the PTP timestamp counter 134 into the RTP timestamp. SMPTE2022-2 specifies the RTP timestamp of 32 bits to be set using the 90 KHz clock rate, and SMPTE2022-6 specifies the RTP timestamp of 32 bits to be set using the 27 MHz clock rate. On the other hand, since the PTP timestamp counter 134 has the nanosecond counter, it is considerably different in clock rate between the PTP timestamp and the RTP timestamp. Converting the PTP timestamp into the RTP timestamp with the 90 KHz clock rate or the 27 MHz clock rate allows for using the timestamp field (32 bits) specified in the RTP. That is, it is possible to send the IP-packets in the conventional format specified in the RTP while achieving high accuracy according to PTP.

Figure 5:
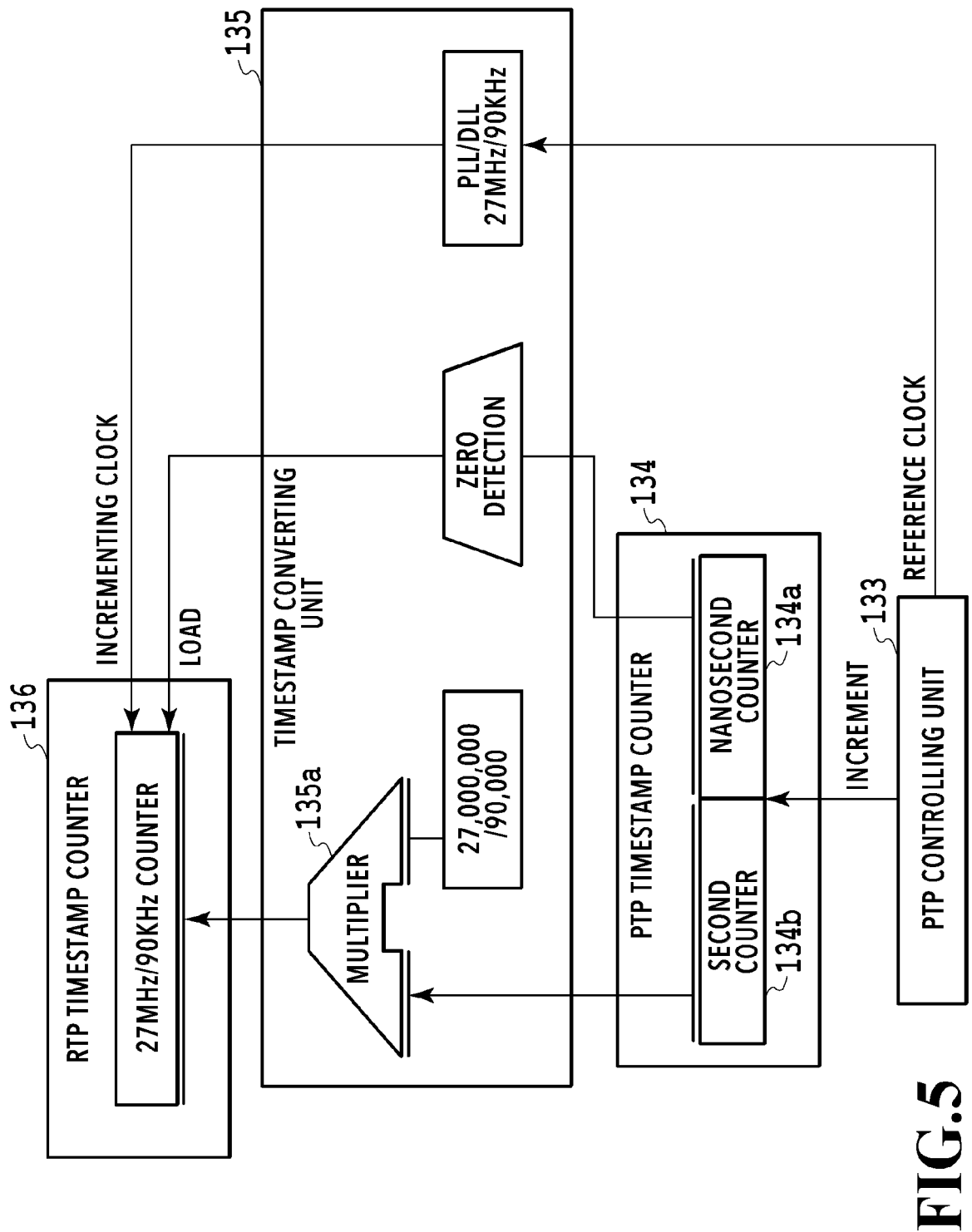
FIG. 5 shows conversion of timestamp according to a first embodiment.

A specific example of converting the timestamp is described in reference to FIG. 5. The timestamp converting unit 135, when the nanosecond counter 134a of the PTP timestamp counter 134 reaches zero, multiplies the counter values in nanosecond counter 134b and values 27,000,000 (decimal numeral) or values 90,000 (decimal numeral) using the multiplier 135a, and sets the multiplied values to the RTP timestamp counter 136. The values 27,000,000 are multiplied in SMPTE2022-6, and the values 90,000 are multiplied in SMFPTE2022-2. It is noted that the values to be multiplied is described in decimal numeral for explanation, however actually the binary arithmetic operation is applied in the circuit.

The timestamp converting unit 135 receives the clock as a reference clock from the PTP controlling unit 133, the clock from the PTP controlling unit 133 was synchronized with the clock for updating the PTP timestamp counter 134. The timestamp converting unit 135 generates the clock with 27 MHz or 90 KHz using the PLL or DLL based on the reference clock. Then, the timestamp converting unit 135 increments the RTP timestamp counter 136 using the clock with 27 MHz or 90 KHz. Thereby, it is possible to generate the timestamp specified in RTP while achieving high accuracy according to PTP.

The incremented timestamp of the RTP timestamp counter 136 is set to the RTP timestamp field in the RTP header in the IP-packets generated by the IP-packet generating unit 132. The embodiment is not limited to the above description, in the case of transmitting the video signals according to SMFTE2022-6 for example, the timestamp of the RTP timestamp counter 136 may be set to the video timestamp field in the media payload header. RTP specifies that the RTP format includes the media payload header within the RTP header, and includes the video timestamp in the media payload header. Further, the PTP timestamp may be set to the RTP header or unused field in the RTP payload without converting to the RTP timestamp. In this case, the timestamp determining unit 143 described below would determine the IP-packets including the same payloads from the two IP-packet streams using the values of the PTP timestamps.

The sending unit 137 sends packet-by-packet the IP-packet stream generated by the IP-packet generating unit 132 via the data network interface 138 over the IP-network 15.

The data network interface 138 functions as a network interface with Ethernet network for transmitting the IP-streams. The control network interface 139 functions as a network interface with Ethernet network for PTP. The data network interface 138 and the control network interface 139 may be implemented as one interface. In this case, one network interface functions as both of the data network interface 138 and the control network interface 139.

Figure 6:
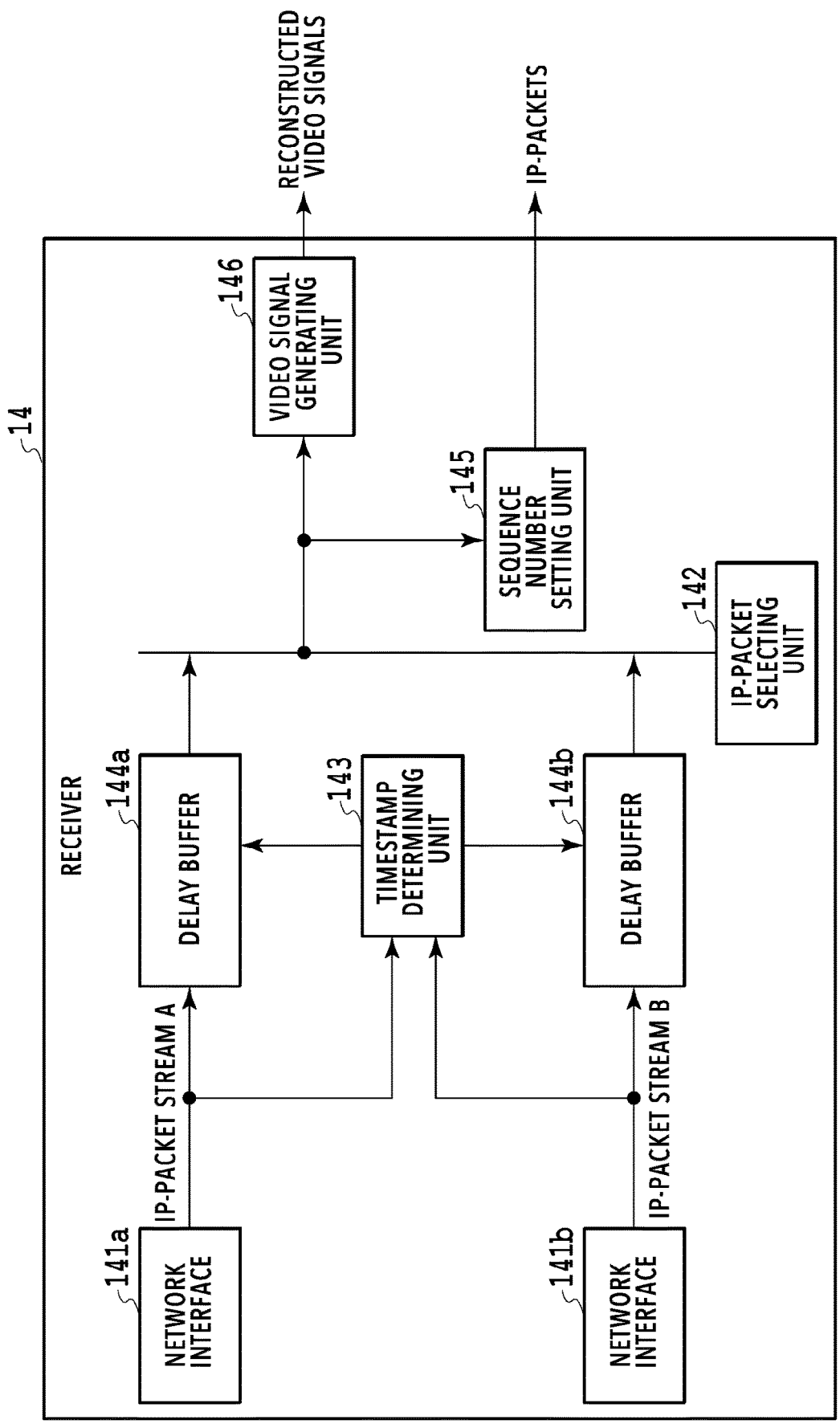
FIG. 6 shows a configuration of a receiver according to a first embodiment.

Then, referring to FIG. 6, a configuration of the receiver 14 described in reference to FIG. 3 is described. The receiver 14 comprises a network interface 141a, a network interface 141b, an IP-packet selecting unit 142, a timestamp determining unit 143, a delay buffer 144a, a delay buffer 144b, a sequence number setting unit 145, and a video signal generating unit 146.

The network interface 141a receives the IP-packet stream A sent via the transmission path 16. The network interface 141b receives the IP-packet stream B sent via the transmission path 17.

Figure 7:
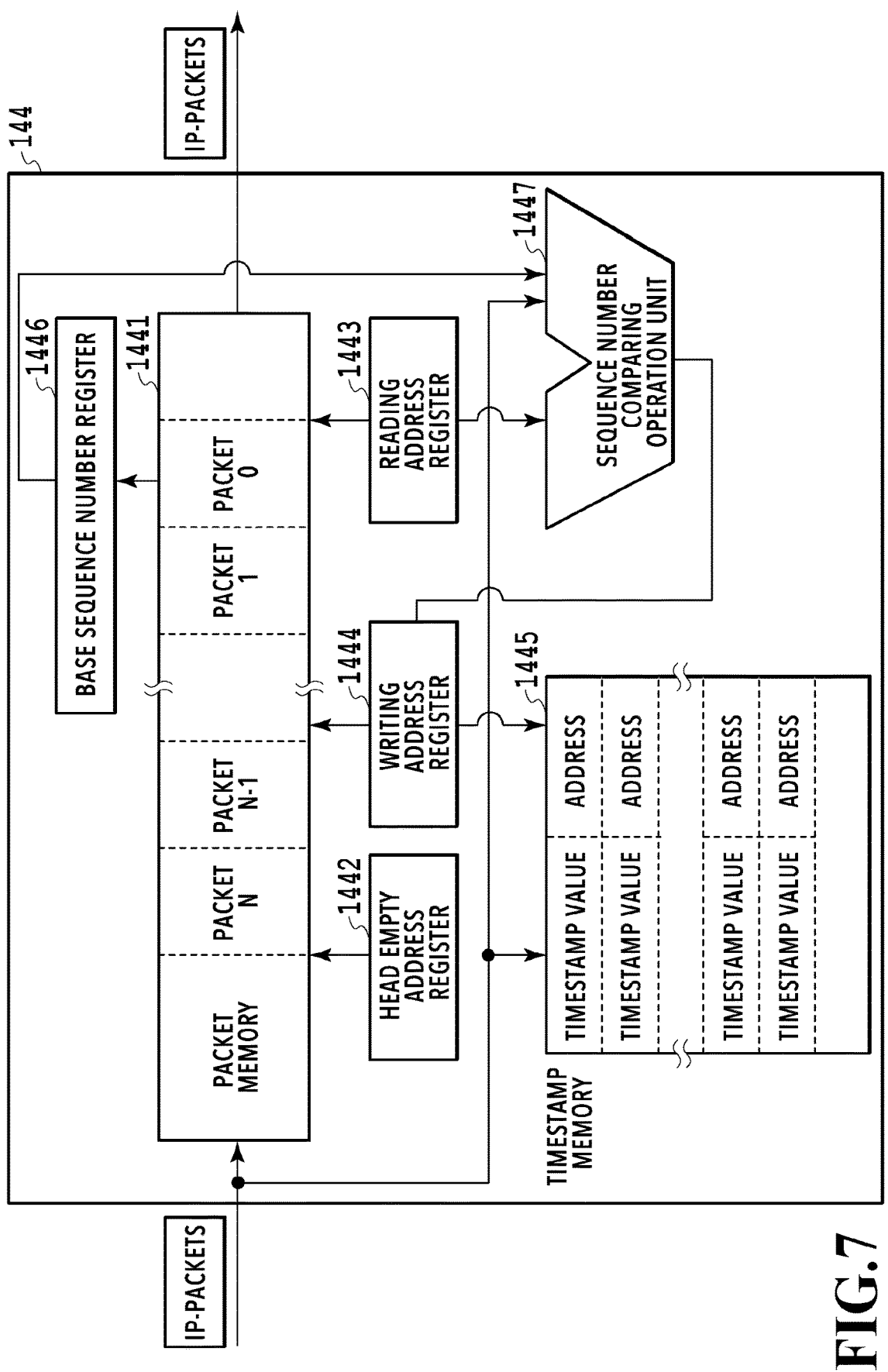
FIG. 7 shows a configuration of a delay buffer according to a first embodiment.

The delay buffer 144a stores the IP-packet stream A received by the network interface 141a. The delay buffer 144b stores the IP-packet stream B received by the network interface 141b. Hereinafter the delay buffers 144a and 144b are collectively referred to as "delay buffer 144". The IP-packet selecting unit 142 controls the delay time such that when selecting the IP-packet to be sent to the video signal generating unit 146, the IP-packets in IP-packet streams A and B including the same payloads are outputted at the same timing. A specific configuration of the delay buffer 144 is shown in FIG. 7.

The delay buffer 144 comprises a packet memory 1441, a head empty address register 1442, a reading address register 1443, a writing address register 1444, a timestamp memory 1445, a base sequence number register 1446, and a sequence number comparing operation unit 1447.

The packet memory 1441 stores the IP-packets received by the delay buffer 144. The IP-packets stored in the packet memory 1441 are synchronized with the video signals, and are read continuously.

The head empty address register 1442 indicates the head empty area in the packet memory 1441. The head empty address register 1442 is updated to indicate new head empty address when the IP-packets is written in the packet memory 1441 and the empty area is changed.

The reading address register 1443 indicates the reading address for outputting the IP-packets to the IP-packet selecting unit 142. The delay buffer 144 functions as a FIFO (First In First Out) for the head point indicated by the reading address register 1443 and the trail point indicated by the head empty address register 1442.

The writing address register 1444 indicates the writing address for writing the IP-packets received by the delay buffer 144.

The timestamp memory 1445 indicates the correspondence between the RTP timestamps of the IP-packets written in the packet memory 1441 and the addresses of IP-packets written in the packet memory. The base sequence number register 1446 indicates the RTP sequence numbers of the IP-packets stored to the addresses indicated by the reading address register 1443 in the packet memory 1441. The sequence number comparing operation unit 1447 determines the writing address for the received IP-packets by calculating the difference between the base sequence number register 1446 and the RTP sequence numbers of the received IP-packets, and adding the difference to the reading address register 1443.

It is noted that in the embodiment, one address is used for one IP-packet as the reading address, the writing address, and the head address. That is, one word in the packet memory corresponds to the number of bites of IP-packet. In implementation, it is possible that the packet memory is implemented with word width of 32 bits or 64 bit by offsetting the lower of the above addresses.

The reading address register 1443 is updated to indicate the IP-packet to be read subsequently when the IP-packets in the packet memory 1441 are read. The area in the packet memory 1441 in which the read IP-packets were stored is set "empty". One example of setting "empty" is to clear the areas to zero. At the same time, the base sequence number register 1446 is updated with the RTP sequence numbers of the IP-packets stored to the updated addresses indicated by the reading address register 1443.

The operation in the case that the IP-packets are stored in the delay buffer 144a and the operation of the timestamp determining unit 143 are described.

Returning to FIG. 6, the timestamp determining unit 143 receives the IP-packets from the network interface 141a, and calculates the differences between the RTP timestamps of the IP-packets and the timestamps of all entries in the timestamp memory 1445 of the delay buffer 144b. If the difference within a predetermined range is not detected, the timestamp determining unit 143 determines that the network interface 141b does not receive the IP-packets including the same payloads as those received by the network interface 141a. In this case, the sequence number comparing operation unit 1447 compares the RTP sequence numbers of the IP-packets in the delay buffer 144a with the RTP sequence numbers in the base sequence number register 1446, and adds the values in the reading address register 1443 to the RTP sequence numbers. The added values are written in the writing address register 1444, and the IP-packets are written in the corresponding addresses in the packet memory. If the address written in the writing address register 1444 is not included in the address between the address indicated by the reading address register 1443 and the address that is one previous to the address indicated by the head empty address register 1442, that is if the address written in the writing address register 1444 is in the empty area, the values written in the head empty address register 1442 are set to the address next to the written address. At the same time, the combination of the address written in the packet memory 1441 and the timestamp of the IP-packet are stored in the head empty address register 1442.

The timestamp determining unit 143 reads the information stored in the timestamp memory 1445 of the delay buffer 144a if the network interface 141b receives the IP-packets. The information is used for detecting the IP-packets including the same payloads in the IP-packet streams A and B.

The timestamp determining unit 143 calculates the differences between the RTP timestamps of the IP-packets and the timestamps of all entries in the timestamp memory 1445 of the delay buffer 144b. If the difference within a predetermined range is detected, the timestamp determining unit 143 determines that the network interface 141b has already received the IP-packets including the same payloads as those received by the network interface 141a. The received IP-packets are stored in at the same location in the delay buffer 144a as that in the delay buffer 144b. At the same time, the combination of the address written in the packet memory 1441 and the timestamp of the received IP-packet are stored in the timestamp memory 1445 of the delay buffer 144a. The "same location" refers to the location in the delay buffer 144a in which the delay time until the IP-packets stored in the delay buffer 144a are outputted by the delay buffer 144a is equal to the delay time until the IP-packets including the same payloads are outputted by the delay buffer 144b.

More specifically, it is derived from the following operations:

(1) Read the address corresponding to the timestamp of the IP-packet including the same payload in the timestamp memory 1445 of the delay buffer 144b.
(2) Subtract the values in the reading address register 1443 of the delay buffer 144b from the read address.
(3) Add the values in the reading address register 1443 of the delay buffer 144a to the subtracted values, and set the added values as the writing address, and set the writing address in the writing address register 1444 of the delay buffer 144a.

If the address written in the writing address register 1444 is not included between the address indicated by the reading address register 1443 and the address that is one previous to the address indicated by the head empty address register 1442, that is if the address written in the writing address register 1444 is in the empty area, the values in the head empty address register 1442 are set to the address next to the written address.

Storing the IP-packets including the same payloads in the "same location" in two delay buffers controls such that when outputting from the two delay buffers, the delays in active system and backup system match.

If the IP-packet is missed in the transmission path 16 or the transmission path 17, the address in which the missed IP-packet is to be stored in packet memory 1441 is "empty" without writing the IP-packet. There is an "empty" area within the written IP-packet stream between the reading address and the head empty address in the packet memory 1441.

The above operations is applied to the case that the network interface 141a receives the IP-packets. If the network interface 141b receives the IP-packets, the delay buffer 144b functions same as the delay buffer 144a as described above.

The combination of the addresses and timestamps stored in the timestamp memory 1445 of the delay buffer 144a and in the timestamp memory 1445 of the delay buffer 144b are deleted when reading the IP-packet.

As stated above, the timestamp determining unit 143 compares the RTP timestamp of the IP-packet received by the network interface 141a with the RTP timestamp of the IP-packet received by the network interface 141b. If the compared result is within a predetermined range, the timestamp determining unit 143 determines that both of the IP-packets include the same payloads. More specifically, if the difference between the timestamps of both of the IP-packets are within a threshold value permitted between the plurality of transmitters that synchronize the times according to FTP, the timestamp determining unit 143 determines that both of the IP-packets include the same payloads.

The threshold value may be a value including the maximum statistic value for the timing error at which the transmitters 13a and 13b receive the video signals distributed by the distributor 11, respectively. Alternatively, the threshold value may be a value including the maximum statistic value for the timing error at which the two IP-packets are generated that the receiver 14 determines to include the same payloads. The threshold value may be a preset value. In this case, statistical value obtained experimentally may be set to the threshold value. Further, the threshold value may be updated dynamically by the transmitters 13a and 13b sending to the receiver 14, the time at which the video signals are received and the time at which the IP-packets are generated (These times may be obtained by synchronizing the time with the PTP grand master 12).

Summarizing the above, the timestamp determining unit 143 stores the IP-packets in the IP-packet streams A and B in the same location in the delay buffers 144a and 144b when determined that both of the IP-packets include the same payloads. The same location refers to the location in the delay buffers at which the delays in outputting from the delay buffers are equal. Thereby, it controls the delays such that the delays in active system and backup system match.

The IP-packet selecting unit 142 selects the IP-packet for sending to the video signal generating unit 146 among the IP-packets read and outputted continuously from the delay buffers 144a and 144b.

If both of the active system and the backup system are in the normal state, the IP-packet stream A is stored in the delay buffer 144a and the IP-packet stream B is stored in the delay buffer 144b. The IP-packets including the same payloads in both of the IP-packet streams are stored in the "same locations" in the delay buffers 144a and 144b under the control of the timestamp determining unit 143. Therefore, the IP-packets including the same streams in the delay buffers 144a and 144b are outputted at the same timing from the delay buffers, respectively. The IP-packet selecting unit 142 sends to the video signal generating unit 146, the IP-packets from the active system, that is, the output from the delay buffer 144a.

If the active system fails, the IP-packet stream A is not received, and the IP-packets are not stored in the delay buffer 144a, thereby the areas for these IP-packets are "empty". Therefore, when the failure occurs, the IP-packets are not outputted from the delay buffer 144a and the IP-packets are outputted from the delay buffer 144b only. The IP-packet selecting unit 142 selects the IP-packets from the delay buffer 144b to send the IP-packets to the video signal generating unit 146 immediately after detecting that the IP-packets are not from the delay buffer 144a.

The timestamp determining unit 143 may refers, in determining whether the IP-packets include the same payloads, the values in the marker bit (M bit) in the RTP header (when the video signals are compatible to SMPTE2022-6), or the payload unit start indicator in the TS header (when the video signals are compatible to SMFTE2022-2) in the IP-packet. The M bit or the payload unit start indicator may be set the values indicating the video frame boundary. That is, when the M bit (or the payload unit start indicator) in the IP-packet is set the values indicating the video frame boundary, it means that the IP-packet includes the signal indicating the video frame boundary.

If the IP-packets in the IP-packet streams in both of the active system and the backup system indicate the video frame boundary at the same timing, it can be determined that it is likely both of the IP-packets include the same payloads. In addition to determining that the RTP timestamps are within the predetermined threshold value, determining that both of the IP-packets include the signal indicating the video frame boundary at the same timing allows for determining with higher accuracy that both of the IP-packets include the same payloads.

The video signal generating unit 146 reconstructs the video signals based on the IP-packets sent from the IP-packet selecting unit 142. The reconstructed video signals are transmitted to the receiver such as broadcast station.

The sequence number setting unit 145 changes all or some of the MAC headers, the IP headers and the UDP headers in the IP-packets sent from the IP-packet selecting unit by setting the RTP sequence numbers sequentially in them. Then the sequence number setting unit 145 generates new IP-packet stream from the IP-packets set the RTP sequence numbers, and outputs them from the receiver 14. As stated above, it is not necessarily that the RTP sequence numbers set in the IP-packets by the transmitters 13a and 13b include the same numbers. By setting the RTP sequence numbers to the IP-packets according to correct ordering, the receiver 14 can reconstruct, when transmitting to the subsequent relay devices for example, the video signals based on the RTP sequence numbers only without the determination of the timestamps by the subsequent relay devices.

As described above, it is not necessary to match the RTP sequence numbers among the redundant transmitters since the receiver determines whether the plurality of IP-packets sent via the plurality of transmission paths include the same payloads based on the timestamps. That is, the plurality of redundant transmitters can only send the IP-packets set the time-synchronized timestamps, respectively. Then, these timestamps are set according to PTP, thereby allowing the determination with high accuracy.

Also, the transmitter converts the PTP timestamps to the RTP timestamps, and thus, can send the IP-packets in the existing RTP format. Further, since the RTP sequence numbers are set according to correct ordering in the receiver, the relay devices and receivers other than those in the video switching system according to the embodiment can also receive the IP-packet stream from the receiver according to the embodiment, and thus, allowing for relay or reconfiguration of the video signals in the existing scheme according to RTP.

Figure 8:
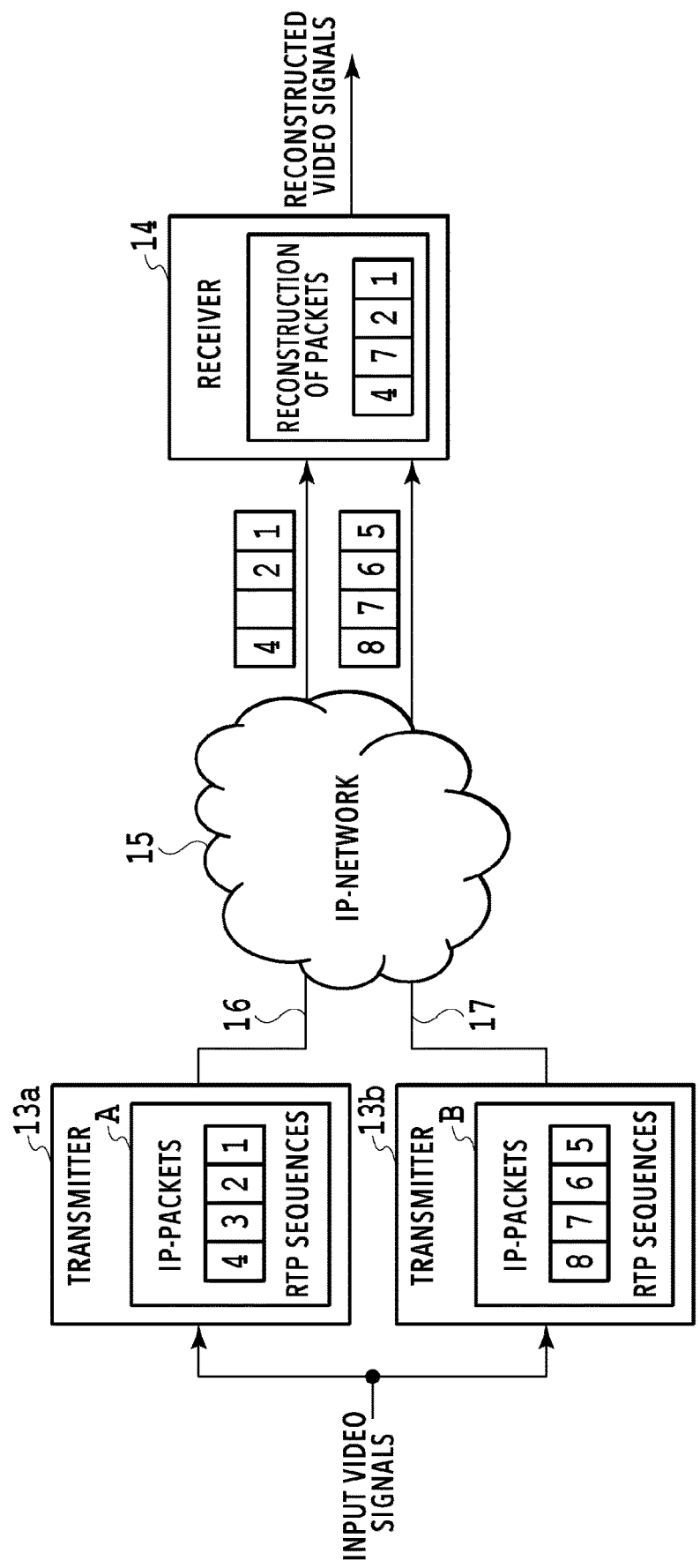
FIG. 8 shows a case that a portion of IP-packets is lost according to a first embodiment.

Then, referring to FIG. 8, a case that a portion of IP-packets is lost is described.

As shown in FIG. 8, respective IP-packets in the IP-packet stream A of the active system sent by the transmitter 13a are set the RTP sequence numbers "1" to "4". On the other hand, respective IP-packets in the IP-packet stream B of the backup system sent by the transmitter 13b are set the RTP sequence numbers "5" to "8", and include the same payloads as those in four IP-packets set the RTP sequence numbers "1" to "4". As stated above, since the sequence numbers are not matched between the transmitters 13a and 13b, even the IP-packets including the same payloads are not necessarily set the same sequence numbers. In the case shown in FIG. 8, it is assumed that the IP-packet set the RTP sequence number "3" (IP-packet to be switched) is lost for some reason among the four IP-packets in the IP-packet stream A over the IP-network 15.

The IP-packet selecting unit 142 of the receiver 14 firstly selects and send to the video signal generating unit 146, two IP-packets in the IP-packet stream A received via the transmission path 16. In the subsequent selection of the IP-packets, it is determined that there is no IP-packet set the RTP sequence number "3", and the IP-packet is switched to the IP-packet set the RTP sequence number "7" outputted from the delay buffer 144b. After that, the IP-packet selecting unit 142 detects the IP-packet set the RTP sequence number "4" outputted from the delay buffer 144a and the IP-packet set the RTP sequence number "8" outputted from the delay buffer 144b, and selects and send to the video signal generating unit 146, the IP-packet set the RTP sequence number "4" of the active system.

In the example shown in FIG. 8, it may also be possible that after selecting the IP-packet of the backup system, even when selecting the IP-packet set the RTP sequence number "4" of the active system, it still select the IP-packet of the backup system.

Also in the example shown in FIG. 8, it is not necessary to match the RTP sequence numbers among the redundant transmitters, and it can determine the IP-packet of the backup system including the same payload as that in the lost IP-packets. Therefore, even when the active system does not fail, it can address the case that a portion of the IP-packets is lost.

Second Embodiment

Then, the second embodiment is described. In the second embodiment, the transmission path is switched by determining the IP-packets including the same payloads based on the M bit (in the case that the video signals are compatible to SMFTE2022-6) or payload unit start indicator in the TS header (in the case that the video signals are compatible to SMFTE2022-2) and the RTP sequence numbers.

Figure 9:
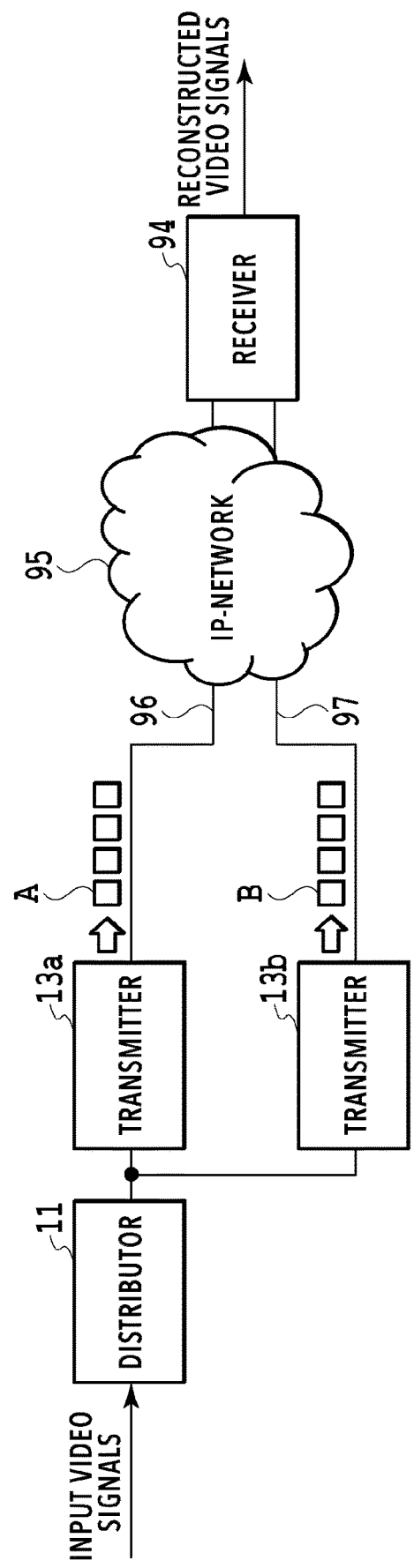
FIG. 9 shows a configuration of a video switching system according to a second embodiment.

The configuration of the second embodiment is shown in FIG. 9. The video switching system according to the second embodiment comprises the distributor 11, the transmitter 13a, the transmitter 13b, and a receiver 94. The transmitter 13a, the transmitter 13b, and the receiver 94 are connected over an IP-network 95. A transmission path 96 is between the transmitter 13a and the receiver 94, and a transmission path 97 is between the transmitter 13b and the receiver 94. It is assumed that the delay time in the transmission path 96 is greater than that in the transmission path 97.

The configuration of the video switching system according to the second embodiment is the same as that in the first embodiment except for not being performed according to PTP and configuration of the receiver 94.

Figure 10:
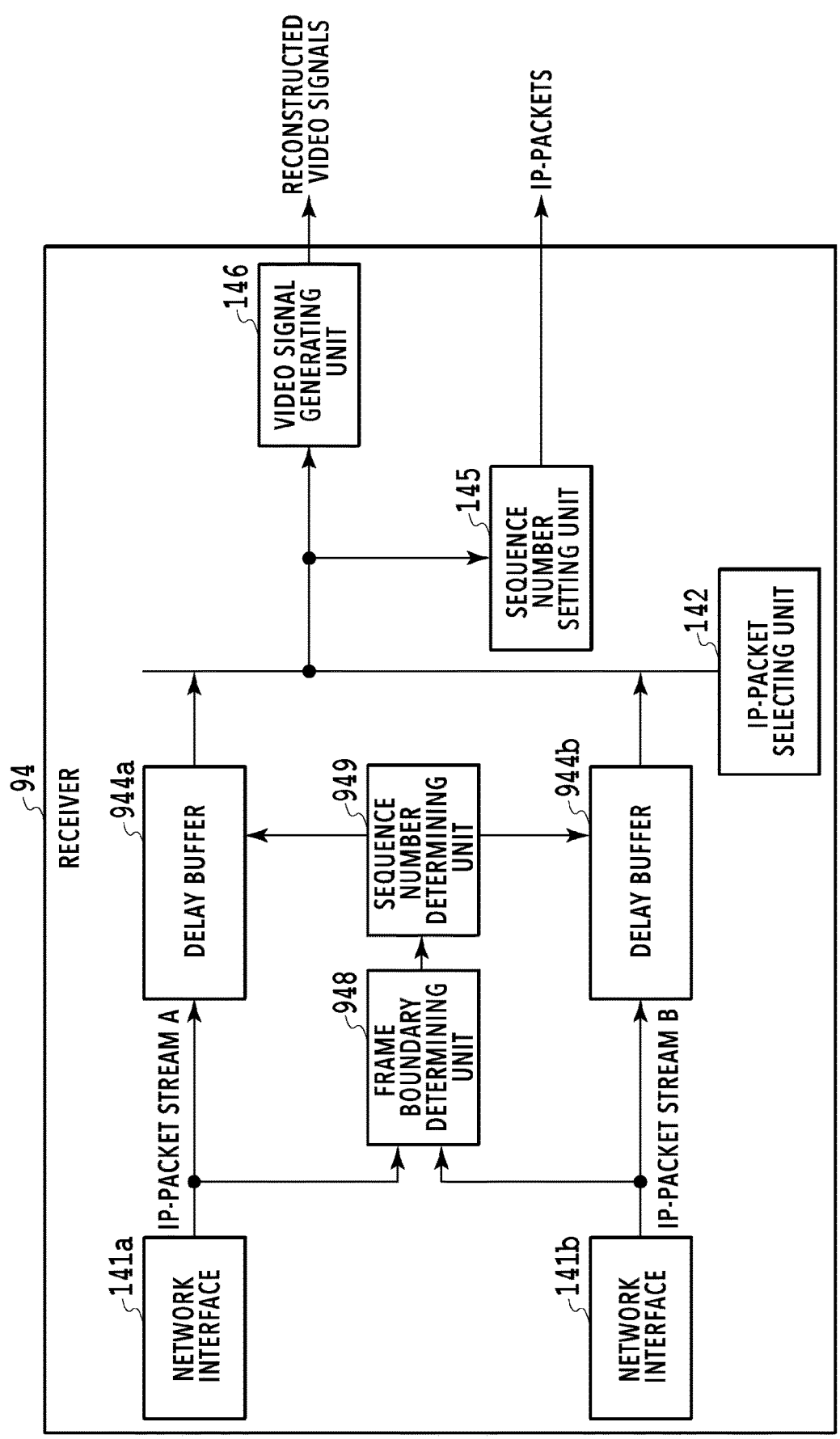
FIG. 10 shows a configuration of a receiver according to a second embodiment.
Figure 11:
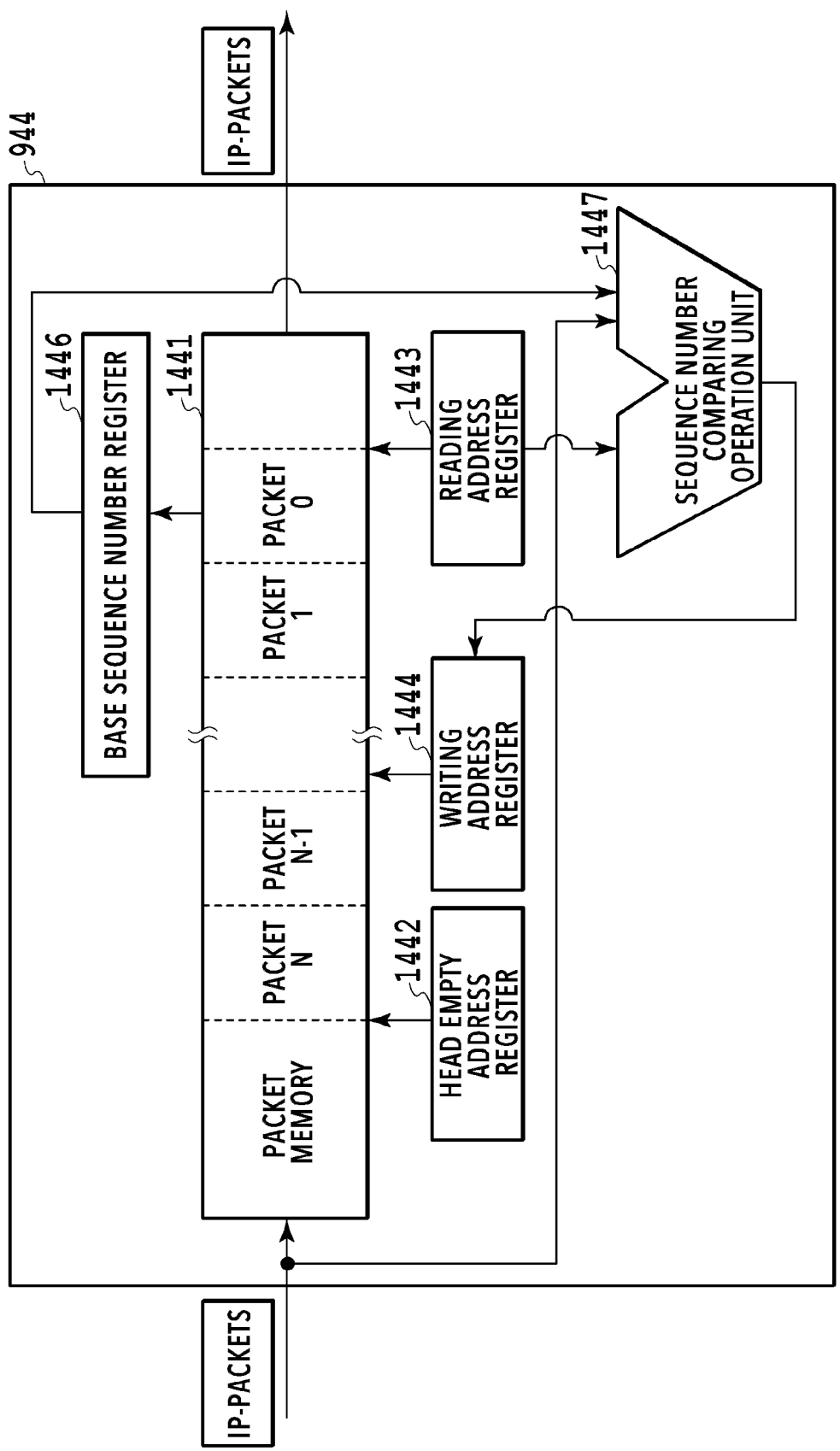
FIG. 11 shows a configuration of a delay buffer according to a second embodiment.

The configuration of the receiver 94 according to the second embodiment is shown in FIG. 10. The receiver 94 does not comprise the timestamp determining unit as in the receiver 14 according to the first embodiment. The receiver comprises a frame boundary determining unit 948 and a sequence number determining unit 949. The delay buffers 944a and 944b according to the second embodiment do not require the timestamp memories as in the delay buffers 144a and 144b in the receiver 14 according to the first embodiment, and have a simple configuration of FIFO shown in FIG. 11. Other configurations are the same as those in the receiver 14 according to the first embodiment.

The frame boundary determining unit 948 determines whether the IP-packets include the signals indicating the video frame boundaries (video frame boundary IP-packet) in two IP-packet streams received via the network interfaces 141a and 141b. More specifically, when the received IP-packets are compatible to SMPTE2022-6, the frame boundary determining unit 948 refers the values in the marker bit of the RTP header, and determines whether the IP-packets correspond to the video frame boundary IP-packets. If the IP-packets correspond to the video frame boundary IP-packets, the RTP sequence numbers in the video frame boundary IP-packets are passed from the delay buffer to the sequence number determining unit 949. When the received IP-packets are compatible to SMFPTE2022-2, the frame boundary determining unit 948 refers the values in payload unit start indicator of the TS header, and determines whether the IP-packets correspond to the video frame boundary IP-packets.

The IP-packet streams A and B are independently set the RTP sequence numbers respectively. The sequence number determining unit 949 receives the RTP sequence numbers in both of the video frame boundary IP-packets determined by the frame boundary determining unit 948. The delay time in the transmission path 96 via which the IP-packet stream A is transmitted is greater than the delay time in the transmission path 97 via which the IP-packet stream B is transmitted. Therefore, for the video frame boundary IP-packets including the same payloads, the IP-packets in the IP-packet stream B are received earlier by the receiver, and the RTP sequence numbers are passed to the sequence number determining unit 949. After that, the IP-packets in the IP-packet stream A are received by the receiver, and the RTP sequence numbers are passed to the sequence number determining unit 949.

Once the received IP-packets are stored in the delay buffer 944b from the network interface 141a, the sequence number comparing operation unit 1447 compares the RTP sequence numbers in the received IP-packets with those in the base sequence number register 1446, and adds the values in the reading address register 1443. The added values are written in the writing address register 1444, and the received IP-packets are written in corresponding address in the packet memory. The address written in the writing address register 1444 is not included in the address between the address indicated by the reading address register 1443 and the address that is one previous to the address indicated by the head empty address register 1442, that is if the address written in the writing address register 1444 is in the empty area, the values written in the head empty address register 1442 are set to the address next to the written address.

The sequence number determining unit 949 stores the RTP sequence numbers (reference numbers B) in the video frame boundary IP-packets in the IP-packet stream B received from the frame boundary determining unit 948. At the same time, the sequence number determining unit 949 reads and stores in the address in which the video frame boundary IP-packets are stored (frame boundary address b), the values stored in the writing address register 1444 in the delay buffer 944b.

After that, the sequence number determining unit 949, when receiving the RTP sequence numbers (reference numbers A) in the video frame boundary IP-packets in the IP-packet stream A from the frame boundary determining unit 948, stores the RTP sequence numbers at "the same location" in the delay buffer 144b as the RTP sequence numbers in the video frame boundary IP-packets in the IP-packet stream B. Here, the "same location" refers to the location in the delay buffer 144a at which the delay time in outputting the video frame boundary IP-packet stored in the delay buffer 144a from the delay buffer 144a is equal to the delay time in outputting the video frame boundary IP-packet stored in the delay buffer 144b from the delay buffer 144b. More specifically, the same location is derived according to the following steps:

(1) Subtracting the values in the reading address register 1443 in the delay buffer 944b from the frame boundary address in the delay buffer 944b;

(2) Adding the subtracted values in (1) to the values in the reading address register 1443 in the delay buffer 944s, and setting the added values as the writing address (frame boundary address a).

In the above steps, if the address written in the writing address register 1444 is not included in the address between the address indicated by the reading address register 1443 and the address that is one previous to the address indicated by the head empty address register 1442, that is if the address written in the writing address register 1444 is in the empty area, the values written in the head empty address register 1442 are set to the address next to the written address.

The sequence number determining unit 949, if receiving the IP-packets in the IP-packet stream A after writing the video frame boundary IP-packets in the delay buffers 944a and 944b, subtracts the reference numbers A from the RTP sequence numbers. Then, the sequence number determining unit 949 adds the delta values (subtracted values) to the frame boundary address a, and writes the added values in the writing address register 1444, and writes the IP-packets in the delay buffer 944a. If the address written in the writing address register 1444 is not included in the address between the address indicated by the reading address register 1443 and the address that is one previous to the address indicated by the head empty address register 1442, that is if the address written in the writing address register 1444 is in the empty area, the values written in the head empty address register 1442 in the delay buffer 944a are set to the address next to the written address.

Similarly, the sequence number determining unit 949, if receiving the IP-packets in the IP-packet stream B, subtracts the reference numbers B from the RTP sequence numbers. Then, the sequence number determining unit 949 adds the delta values (subtracted values) to the frame boundary address b, and writes the added values in the writing address register 1444, and writes the IP-packets in the delay buffer 944b. If the address written in the writing address register 1444 is not included in the address between the address indicated by the reading address register 1443 and the address that is one previous to the address indicated by the head empty address register 1442, that is if the address written in the writing address register 1444 is in the empty area, the values written in the head empty address register 1442 in the delay buffer 944b are set to the address next to the written address.

Summarizing the above, the sequence number determining unit 949 identifies the video frame boundary IP-packets in the IP-packet stream A and the video frame boundary IP-packets in the IP-packet stream B, and stores the respective video frame boundary IP-packets in the "same location" in the delay buffers 944a and 944b. The "same location" refers to the location in the delay buffers at which the delays in outputting from the delay buffers are equal. Thereby, controlling the delays such that the delays in active system and backup system match.

Table 1 show examples of the specific values in the RTP sequence numbers.

TABLE 1

| IP-PACKET STREAM A | | IP-PACKET STREAM B | |
|---|---|---|---|
| RTP SEQUENCE NUMBER | DESCRIPTION | RTP SEQUENCE NUMBER | DESCRIPTION |
| 1029 (REFERENCE NUMBER A) | VIDEO FRAME BOUNDARY IP-PACKET A | 3016 (REFERENCE NUMBER B) | VIDEO FRAME BOUNDARY IP-PACKET A |
| 1030 | FIRST IP-PACKET IN SUBSEQUENT VIDEO FRAME | 3017 | FIRST IP-PACKET IN SUBSEQUENT VIDEO FRAME |
| 1031 | SECOND IP-PACKET IN SUBSEQUENT VIDEO FRAME | 3018 | SECOND IP-PACKES IN SUBSEQUENT VIDEO FRAME |
| 1032 | THIRD IP-PACKET IN SUBSEQUENT VIDEO FRAME | 3019 | THIRD IP-PACKET IN SUBSEQUENT VIDEO FRAME |
| 1033 | NOT RECEIVED | 3020 | FOURTH IP-PACKET IN SUBSEQUENT VIDEO FRAME |
| 1034 | FIFTH IP-PACKET IN SUBSEQUENT VIDEO FRAME | 3021 | FIFTH IP-PACKET IN SUBSEQUENT VIDEO FRAME |

As shown in Table 1, if the IP-packet including the RTP sequence number 1029 in the IP-packet stream A corresponds to the video frame boundary IP-packet, the reference number is 1029. If the IP-packet including the RTP sequence number 3016 in the IP-packet stream B corresponds to the video frame boundary IP-packet, the reference number is 3016.

The IP-packet selecting unit 142 selects the IP-packets to be sent to the video signal generating unit 146 among the IP-packets being read and outputted continuously from the delay buffers 944a and 944b.

If the active system and the backup system are in the normal state, the IP-packet stream A is stored in the delay buffer 944a, and the IP-packet stream B is stored in the delay buffer 944b. The IP-packets including the same payloads in both of the IP-packet streams A and B are stored in the "same location" in the delay buffers 944a and 944b under the control of the sequence number determining unit 949. Therefore, the two IP-packets including the same payloads are outputted from the delay buffers 944a and 944b at the same timing respectively. The IP-packet selecting unit 142 sends the IP-packets of the active system (i.e. IP-packets outputted from the delay buffer 944a) to the video signal generating unit 146.

If the active system fails, the IP-packet stream A is not received, the IP-packets are not stored in the delay buffer 944a, and the area for the IP-packets is empty. Therefore, when the active system fails, the IP-packets are not outputted from the delay buffer 944a, and the IP-packets are outputted from the delay buffer 944b only. The IP-packet selecting unit 142, once detecting that the IP-packets are not outputted from the delay buffer 944a, immediately selects and sends to the video signal generating unit 146, the IP-packets from the delay buffer 944b. In the examples shown in Table 1, the IP-packet including the RTP sequence number 1033 is not included in the IP-packet stream A to be received. Accordingly, the IP-packet selecting unit 142 detects that there are not IP-packets subsequent to the IP-packet including the RTP sequence number 1032 in outputting from the delay buffer 944a, switches the IP-packets from the delay buffer 944a to the delay buffer 944b for sending to the video signal generating unit 146, and sends the IP-packet including the RTP sequence number 3020 to the video signal generating unit 146.

The video signal generating unit 146 reconstructs the video signals based on the IP-packets sent from the IP-packet selecting unit 142. The reconstructed video signals are transmitted to the receiver such as relay station.

The sequence number setting unit 145 changes some or all of the MAC headers, the IP headers, and the UTP headers in the IP-packets sent from the IP-packet selecting unit 142 to set the RTP sequence numbers sequentially, and generates new IP-packet stream and outputs from the receiver 94. As stated above, it is not necessarily that the RTP sequence numbers set in the IP-packets by the transmitters 13a and 13b have the same numbers. By setting the RTP sequence numbers to the IP-packets according to correct ordering, the receiver 14 can reconstruct, when transmitting to the subsequent relay devices for example, the video signals based on the RTP sequence numbers only without the determination of the timestamps by the subsequent relay devices.

As described above, it is not necessary to match the RTP sequence numbers among the redundant transmitters since the receiver determines whether the plurality of IP-packets sent via the plurality of transmission paths include the same payloads based on the video frame boundary IP-packets and the RTP sequence numbers.

It is assumed that the delay time in the transmission path 96 is greater than the delay time in the transmission path 97 and the difference between the delay times is within one video frame time. If the delay time in the transmission path 97 is greater than the delay time in the transmission path 96, the reverse operations in which the IP-packet stream A is replaced with the IP-packet stream B are applied in the receiver 94. Also, if the difference between the delay times is greater than one video frame time, it is necessary to provide another delay buffer 947 for adjusting the difference within one video frame time in storing in the delay buffer 944a and the delay buffer 944b, as shown in FIG. 12.

Figure 12:
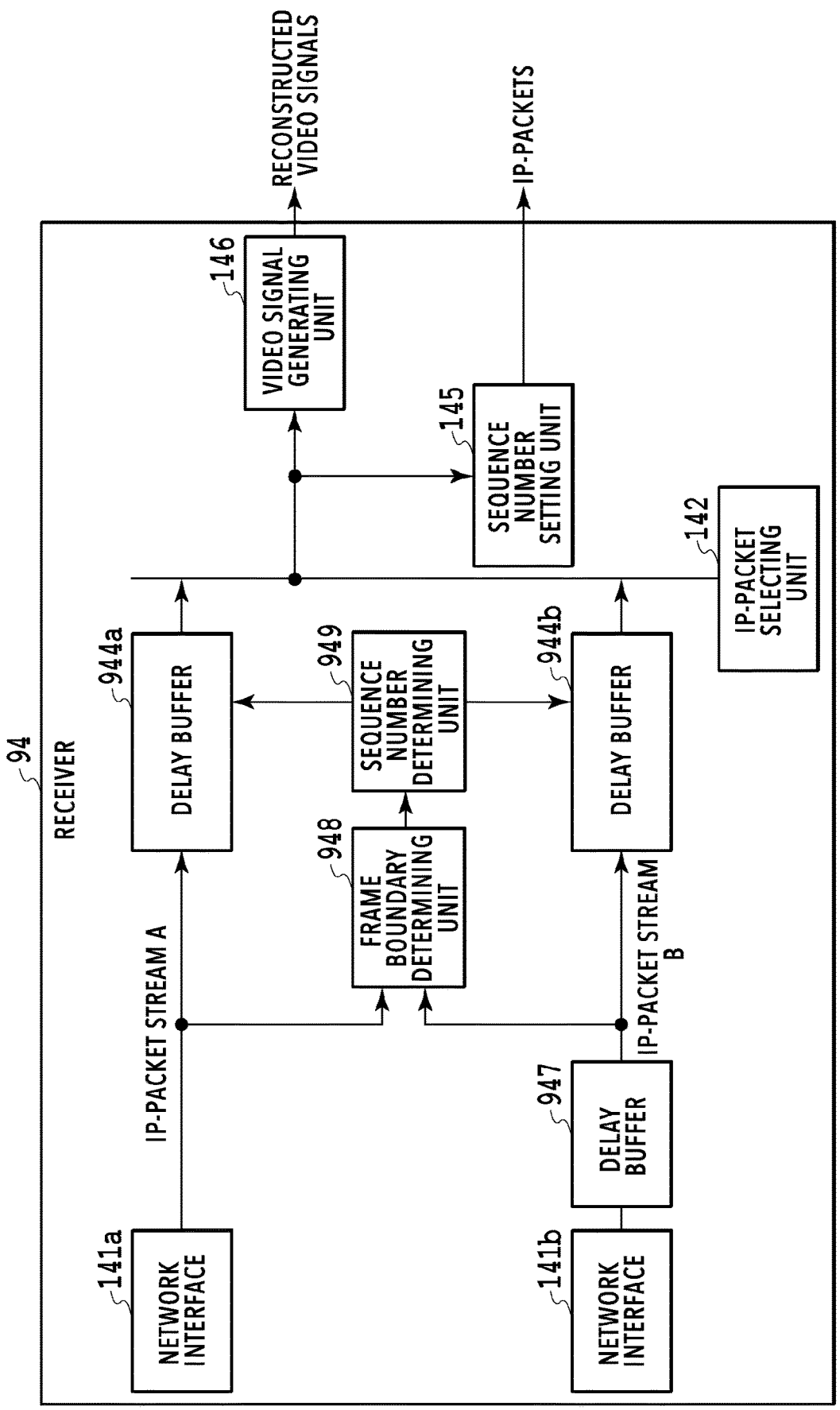
FIG. 12 shows another configuration of a receiver according to a second embodiment.

FIG. 12 shows the configuration in which the differences in the delay times in transmission path 96 and the transmission path 97 are time length by four or five video frames, and the delay buffer 947 is provided for providing fixed delay time with four video frames. The delay buffer 947 includes the same configuration as those in the delay buffer 944a and the delay buffer 944b. For the delay buffer 947, the difference between the head empty address and the reading address is controlled to be four video frames constantly, that is, controlled to be empty by 4× number of IP-packets/video frame. When the IP-packets are received, the values in the head empty address register are moved in the writing address register, and the values in the head empty address register are updated by writing the IP-packets.

It is necessary to measure the difference between the delay times in transmission paths 96 and 97 for the above control. It is easily implement for measurement with the existing technique, and one example is provided without detailed description. In one example of measuring the difference, specific video signals such as color bar are transmitted in the IP-packet stream A and the IP-packet stream B, two receivers with the same internal delay times receive IP-packet stream A and the IP-packet stream B respectively, and measure delay times between the reconstructed video signals.

It is noted that it may set in the RTP headers or unused fields in the RTP payloads in the IP-packets in the IP-packet streams A and B, a count value field indicating the number of IP-packets from the video frame boundary IP-packet in the IP-packet stream. The count value field is initialized when indicating the video frame boundary IP-packet. If the count values in the IP-packets in the IP-packet streams A and B match, it is determined that the both IP-packets include the same payloads. The count values are incremented in the transmitters 13a and 13b. In the above case, it is not necessary to use the RTP sequence numbers in determining whether the IP-packets include the same payloads.

As described above, in the second embodiment, it is not necessary to match the RTP sequence numbers between the transmitters 13a and 13b since the transmitters identify the both IP-packets based on what number the IP-packets in the IP-packet streams A and B are. Also, it is not necessary to implement the PTP slaves in the transmitters 13a and 13b since it is determined whether the IP-packets include the same payloads based on the RTP sequence numbers or the count values from the video frame boundary IP-packet.

The above-mentioned scheme described in the second embodiment may be applied to the case in which a portion of the IP-packets is lost described with respect to FIG. 8.

The video switching system according to the embodiments is described above. It is noted that the operations performed by the components described above, and the order of the operations are merely illustrative.

DESCRIPTION OF REFERENCE NUMBERS

A IP-packet stream
B IP-packet stream
4 Transmission path
5 Transmission path
16 Transmission path
17 Transmission path

The invention claimed is:

1. A video switching system comprising:
a first transmitter configured to synchronize a time with a Precision Time Protocol (PTP) grand master according to PTP;
a second transmitter configured to, independently from the synchronization by the first transmitter, synchronize a time with the PTP grand master according to PTP; and
a receiver connected to the first transmitter and the second transmitter over an IP-network,
wherein the first transmitter and the second transmitter respectively:
receive video signals distributed from one video signal;
divide the video signals into a plurality of IP-packets; and
set timestamps to the plurality of IP-packets, the timestamps based on the synchronized time according to PTP,
the first transmitter sends the plurality of IP-packets set with the timestamps as a first IP-packet stream via a first transmission path according to Real-time Transport Protocol (RTP), the second transmitter sends the plurality of IP-packets set with the timestamps as a second IP-packet stream via a second transmission path according to RTP,
the receiver is further configured to:
compare the timestamps set in the IP-packets between the first IP-packet stream and the second IP-packet stream to calculate a difference between the timestamps;
identify a pair of IP-packets including same payloads in the first IP-packet stream and the second IP-packet stream in response to determining that the difference is within a predetermined range;
if receiving the pair of IP-packets, select one of the pair of IP-packets to reconstruct video signals; and
if receiving one IP-packet of the pair of IP-packets only, use the one IP-packet to reconstruct the video signals.

2. The video switching system according to claim 1, wherein the receiver is further configured to:
determine whether both the pair of IP-packets indicate a video from boundary by comparing fields indicating the video frame boundary in the respective IP-packets of the pair of IP-packets; and
identify the pair of IP-packets further in response to determining that both the pair of IP-packets indicate a video frame boundary.

3. The video switching system according to claim 1, the synchronized time according to PTP is a RTP timestamp, and
the first transmitter and the second transmitter convert time information according to PTP into the RTP timestamp.

4. The video switching system according to claim 1, wherein the receiver is further configured to:
if receiving the pair of IP-packets, select one of the pair of IP-packets to construct a third IP-packet stream; and
if receiving one IP-packet of the pair of IP-packets only, use the one IP-packet to construct the third IP-packet stream.

5. The video switching system according to claim 4, wherein the receiver configured to change at least one of MAC headers, IP headers and UDP headers and sets new numbered RTP sequence number in the third IP-packet stream.

6. A video switching system comprising:
a first transmitter configured to:
receive video signals distributed from one video signal;

divide the video signals into a plurality of IP-packets;
set the Real-time Transport Protocol (RTP) sequence numbers to the plurality of IP-packets; and
send the plurality of IP-packets as a first IP-packet stream via a first transmission path;
a second transmitter configured to:
receive the distributed video signals;
divide the video signals into a plurality of IP-packets;
set the RTP sequence numbers to the plurality of IP-packets independently from the RTP sequence numbers set by the first transmitter; and
send the plurality of IP-packets as a second IP-packet stream via a second transmission path according to RTP;
a receiver connected to the first transmitter and the second transmitter over an IP network, the receiver configured to:
determine a first IP-packet indicating a video frame boundary in the first IP-packet stream;
determine a second IP-packet indicating a video frame boundary in the second IP-packet stream;
calculate a first delta value by subtracting a sequence number in the first IP-packet from a sequence number in any IP-packet in the first IP-packet stream;
calculate a second delta value by subtracting a sequence number in the second IP-packet from a sequence number in any IP-packet in the second IP-packet stream;
identify a pair of IP-packets including same payloads in the first IP-packet stream and the second IP-packet stream in response to that the first delta value and the second delta value match;
if receiving the pair of IP-packets, select one of the pair of IP-packets to reconstruct video signals; and
if receiving one IP-packet of the pair of IP-packets only, use the one IP-packet to reconstruct the video signals.

7. The video switching system according to claim 6, wherein the receiver is further configured to:
if receiving the pair of IP-packets, select one of the pair of IP-packets to construct a third IP-packet stream; and
if receiving one IP-packet of the pair of IP-packets only, use the one IP-packet to construct the third IP-packet stream.

* * * * *

UNITED STATES PATENT AND TRADEMARK OFFICE
CERTIFICATE OF CORRECTION

PATENT NO. : 11,122,310 B2  
APPLICATION NO. : 16/645890  
DATED : September 14, 2021  
INVENTOR(S) : Kazunori Nakamura et al.

Page 1 of 1

It is certified that error appears in the above-identified patent and that said Letters Patent is hereby corrected as shown below:

In the Claims

Column 18, Line 41, Claim 2, delete "from" and insert -- frame --

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*